Feb. 11, 1941.  A. KEEFE  2,231,449
AIR VALVE
Filed March 31, 1937
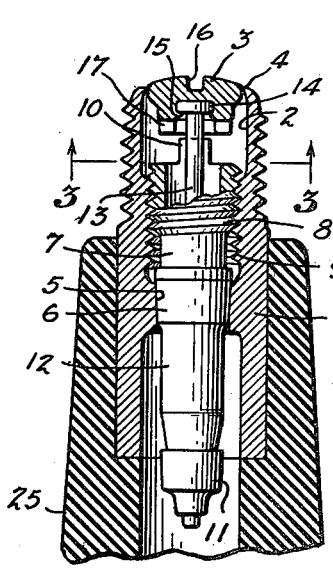
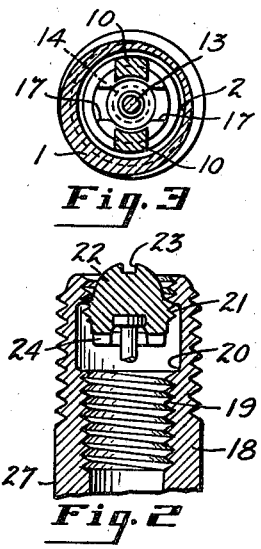
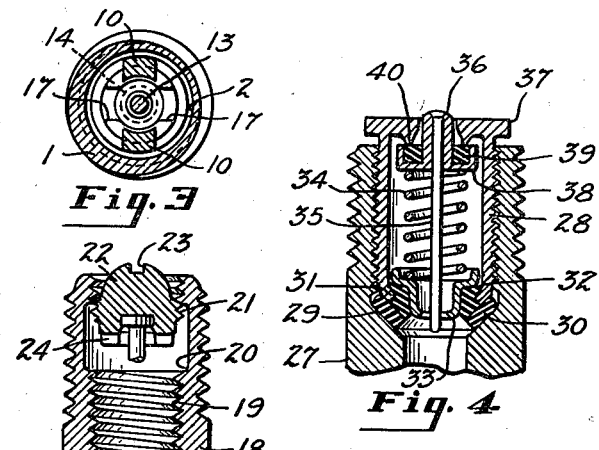
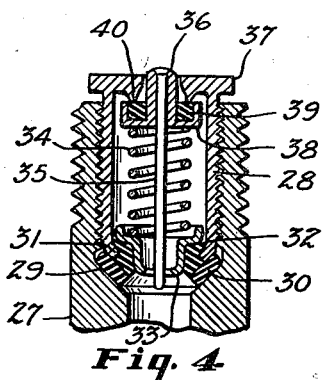
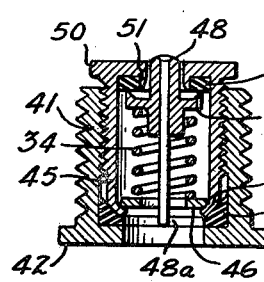
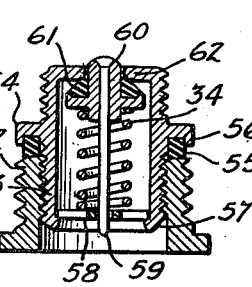
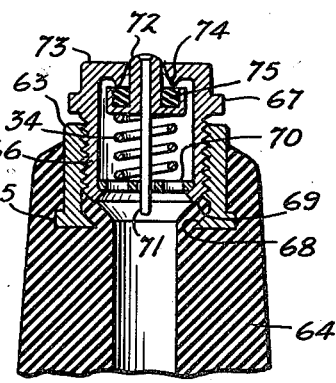
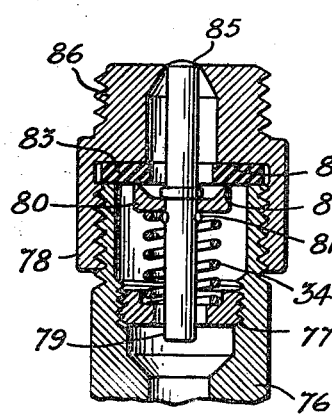
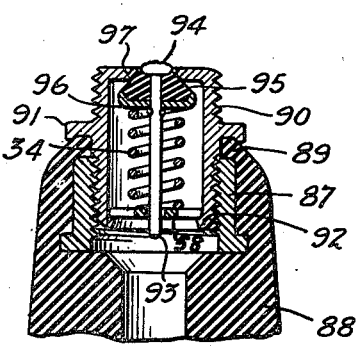
INVENTOR
*Arthur Keefe*
BY
*O.Z.McCoy*
ATTORNEY Patented Feb. 11, 1941

2,231,449

UNITED STATES PATENT OFFICE 2,231,449

AIR VALVE

Arthur Keefe, Akron, Ohio

Application March 31, 1937, Serial No. 134,114

2 Claims. (Cl. 277—42)

This invention relates to air valves and more particularly to valve assemblies for use with pneumatic tires.

An object of the present invention is to provide simplified and improved air valves that consist of small numbers of standardized parts that are readily constructed on conventional machines and that are easily and inexpensively assembled to form valves at low cost.

Another object is to provide adaptations of conventional valves that improve the function of the valve and that provide greater convenience in their use.

With the above and other objects in view that will be apparent to those familiar with the art to which the present invention pertains, suitable illustrative embodiments of the invention are disclosed in the accompanying drawing, wherein:

Fig. 1 is a fragmentary elevational section of a dust cap adaptation for a conventional ferrule and core assembly with either a rubber or metal valve stem;

Fig. 2 is a peripherally threaded dust cap modification of the structure that is shown in Fig. 1;

Fig. 3 is a section taken along the line 3—3 of Fig. 1;

Fig. 4 is a fragmentary elevational section of a valve stem and core assembly comprising a dust cap releasable air seal and an inwardly disposed permanent air seal;

Fig. 5 is an elevational section of a ferrule and valve core assembly comprising a dust cap releasable air seal wherein dust cap releasable air seal rubber is positioned to avoid the accumulation of gravity carried sand particles and the like, and an inwardly disposed permanent seal;

Fig. 6 is an elevational section of a ferrule and valve core assembly wherein the dust cap releasable air seal has an inclined face and wherein the permanent air seal is disposed externally of the assembly;

Fig. 7 is a fragmentary elevational section of a rubber valve stem, ferrule and dust cap releasable air seal core assembly, and wherein the valve stem rubber forms the internal permanent air seal;

Fig. 8 is a fragmentary elevational section of a dust cap releasable air seal type of valve core and stem or ferrule assembly and wherein a rubber washer forms both the releasable and the permanent air seals; and Fig. 9 is a fragmentary elevational section of a dust cap releasable air seal valve core, with ferrule and rubber stem wherein the rubber valve stem forms the outside permanent air seal.

In the valve assembly that is shown in Fig. 1 of the accompanying drawing, the ferrule 1 is of conventional type with the inside threads cut away, or the ferrule expanded circumferentially, to provide a smooth inner face 2 and to provide clearance for the reciprocating dust cap plug 3. The upper peripheral edge 4 of the ferrule 1, is pressed radially inwardly to form dust and water sealing engagement with the dust cap plug 3, that is dimensioned to pass substantially freely therethru with a minimum of clearance.

The frustro-conical face 5 of the ferrule 1, is engaged by the rubber faced frustro-conical portion 6 of the conventional valve core 7 to form the permanent air seal of the valve and ferrule assembly on the interengagement and the tightening of the core threads 8 with the ferrule threads 9. The core 7 is rotated in the ferrule 1 by the application of a wrench to the radially extending core wrench lugs 10.

The cap 11 contains a rubber seat that is pressed exially upwardly against the knife edge lower extremity of the barrel 12 by a spring that is disposed within and supported by the barrel 12 and that engages the pin 13 and presses it axially upwardly of the assembly. The cap 11 is moved away from the lower edge of the barrel 12 by pressure that is applied axially downwardly on the pin head 14.

The dust cap plug 3 is mounted on the pin head 14 in any suitable manner, as by being clamped therearound with the plug flange 15 engaging the under side of the pin head 14, or the like. The dust cap plug 3 forms dust and water sealing engagement with the ferrule edge 4. The screw driver or tool blade receiving slot 16 in the dust cap plug 3, provides tool engaging means whereby the plug lugs 17 engage the core lugs 10 to effect the rotation of the valve core 7 in the ferrule 1.

Provision is made for the depression of the plug lugs 17 past the core lugs 10, when registered therewith, by any suitable mechanical construction, as by providing ample clearance therebetween, as shown, or by a matter of degree of the length of the lugs or the degree of inclination of the lug side walls.

The plug lugs 17 and the core lugs 10 may be of sufficient length to engage each other at all times and still have ample axial freedom for the proper operation of the valve, or they may be of a sufficient degree of side wall inclination so that they both are of substantially knife edge construction whereby they substantially cannot jam against each other axially even when they are in axial registration with each other.

Thru the interengagement of the plug lugs 17 and the core lugs 10, a core can be installed in or removed from the ferrule 1 just as readily as with the present forms of conventional equipment.

The use of the dust cap plug 3 facilitates, in time and effort, the passing of air in either direction thru the ferrule 1 and makes unnecessary and undesirable the use, as heretofore, of the externally mounted cap that threads on the outside of the ferrule 1.

The metal stem or ferrule 18 in Fig. 2 has its radially inner threads 19 cut away to provide the threadless area 20 on axially either side of which the threads 19 are provided for engagement with the core threads 8 of the valve core 7, and the plug peripheral threads 21 on the dust cap plug 22. The plug tool blade slot 23 in the plug 22 provides means for rotating the plug and the valve core 7 when the core lugs 10 are engaged by the plug lugs 24.

A slight axial clearance between the plug peripheral threads 21 and the radially inner threads adjacent the free end of the ferrule 18 is provided in this structure to compensate for valve face wear. The use of the conventional external dust cap is also advisable with this form of structure in rural sections where the structure is exposed to mud and the like.

The structures that are shown in Figs. 1 and 2, may be used in conjunction with a rubber valve stem, such as the rubber stem 25, or with a metal valve stem, as 18, as desired.

Another adaptation of substantially the structure that is shown in Fig. 2 hereof, is shown in Fig. 6 of my co-pending application, Serial Number 115,060, filed December 10, 1936.

In the dust cap form of releasable air seal that is shown in Fig. 4 of the accompanying drawing, the metal stem 27, that may be conventional or replaced by a similarly constructed ferrule in a stem of rubber or other suitable material, as desired, terminates in a free end that is threaded internally to engage the removable, externally threaded thimble 28 or other suitable form of dust cap. The stem 27 also preferably has a permanent air seal face disposed in its interior, such as the conventional frustroconical face 29.

The rubber washer 30 is interposed between the inturned edge 31 of the side wall of the thimble 28 and the stem face 29 and is placed under compression by the rotation of the thimble 28 within the stem 27. The rubber bushing 32 is interposed radially between the thimble edge 31 and the thimble plug 33 and is preferably vulcanized to or mechanically anchored in the plug 33. The plug 33 serves as a support for the compression spring 34 and is apertured centrally to permit the free passage of air therethru and to serve as a guide to the valve pin 35.

The upper end of the valve pin 35 is anchored in the dust cap plug portion 36 that forms dust and water sealing engagement with the air admitting aperture that is disposed centrally of the thimble top 37. The plug 36 carries the air seal cup 38 in which the rubber releasable air seal ring 39 is disposed. The circular knife edge 40 of the thimble top 37 preferably inclines radially away from the upper end of the plug 36. The periphery of the thimble top 37 provides a grip for tools, such as pliers, a wrench, the fingers or the like, for assembling or disassembling the thimble 28 and the stem 27.

The ferrule 41, that is shown in Fig. 5, has a radially extending flange 42 at its base that supports the permanent air seal rubber ring 43 on its axially upper face. The flange 42 may also continue radially outwardly of the ferrule 41, if desired, to improve the anchorage of the ferrule in a rubber valve stem. The ferrule 41 may be replaced by a metal stem, if desired.

The inturned lower edge 44 of the dust cap or thimble 45, that threads into the ferrule 41, places the rubber ring 43 under compression to form a permanent air seal between the ferrule and the thimble. The thimble edge 44 also supports the centrally apertured washer 46 on which the compression spring 34 rests.

The spring 34 releasably supports the knife edge 47 of the dust cap plug 48 in its engagement with the releasable valve seat rubber ring 49. The upper end of the pin 48a is anchored in the plug 48. The rubber ring 49 is secured to the under side of the top 50 of the thimble 45 by the axially extending flange 51 and is preferably vulcanized thereto, or is similarly supported permanently in position where dust particles and the like will accumulate thereon. The axially extending flange 51 preferably inclines radially away from the dust cap plug 48, with which it makes a dust and water seal at its upper end.

The ferrule 52, that is shown in Fig. 6, is threaded internally for the reception of the exteriorly threaded lower part of the thimble 53. The radially projecting rib 54, that is disposed between the ends of the thimble 53, provides a finger or a tool grip in the assembly and the disassembly of the thimble and ferrule. The rubber ring 55 is disposed on the under side of the rib 54 and forms a permanent, exteriorly disposed air seal between the upper edge of the ferrule 52 and the thimble 53. The axially extending flange 56 on the rib 54, assists in securing the permanent valve seat rubber ring 55 in place. The ring 55 may be vulcanized to the thimble or otherwise secured in place, if desired. The ferrule 52 may also be replaced with a metal valve stem, if desired.

The lower edge 57 of the thimble 53 is inturned to support the spider 58 on which the spring 34 rests. The spider 58 is apertured at substantially its center for the passage therethru and guidance of the pin 59. The pin 59 is anchored at its upper end in the dust cap air seal plug 60. The dust cap air seal plug 60 carries the frustroconical rubber ring 61 that makes releasable air sealing engagement with preferably the corner edge 62 of the air transmitting aperture in the top of the thimble 53. The dust cap air seal plug 60 preferably also makes dust and water excluding engagement with the centrally disposed aperture in the top of the thimble 53.

The ferrule 63, that is shown in Fig. 7, has a lower part that is embedded in the rubber valve stem 64 that is vulcanized on both radial surfaces of the ferrule flange 65. The ferrule 63 is threaded internally for the reception of the externally threaded lower part of the thimble 66. The thimble tool rib 67 provides a tool grip on the thimble 66 whereby the valve stem rubber that overlies the ferrule frustro-conical radially inner face 68, may be strongly compressed by the thimble frustro-conical face 69 that forms the lower extremity of the thimble 66, to form a permanent air seal therebetween. The inturned flange that forms the lower extremity of the thimble 66 also supports the apertured disc 70 on which the spring 34 rests, and that serves as a guide for the valve pin 71.

The dust cap plug 72, in which the pin 71 is anchored at its upper end, makes dust and water engagement with the air intake and exhaust aperture that is disposed centrally of the upper face 73 of the thimble 66. The axially directed knife edge 74 of the upper face of the thimble 66 makes releasable air sealing engagement with the releasable dust cap plug valve seat rubber ring 75 that is carried by the plug 72.

The insert or metal stem 76, that is shown in Fig. 8 of the accompanying drawing, is threaded internally for the reception of the peripherally threaded spring supporting plate 77, and externally for the reception of the internally threaded lower end of the dust cap 78. The plate 77 supports the spring 34 substantially uniformly spaced from the pin 79 as in the cup shown and is apertured centrally for the passage of air therethru and for the guidance of the pin 79 where desired.

The pin 79 carries the releasable air valve 80 between its ends and in air sealing engagement with the pin, as by suitable means such as the flange and the weld rings 81 that are disposed on axial sides thereof. The valve 80 has the axially extending knife edge 82 along its periphery that engages a suitable air retaining valve seat such as the substantially flat rubber washer 83 in releasable air sealing contact. The rubber washer 83 is centrally apertured for the passage of air therethru on its disengagement with the plate knife edge 82. The rubber washer 83 is also interposed between the upper extremity of the stem 76 and the radially extending shoulder 84 of the cap 78 to form a permanent air seal therebetween. The cap shoulder 84 also provides a firm support for the releasable air valve washer 83.

The upper extremity of the pin 79 forms dust and water sealing frictional engagement with the pin guiding inwardly flaring central aperture 85 in the upper portion 86 of the cap 78. The upper portion 86 of the cap 78 is preferably threaded externally in conventional manner for the reception of conventional inflation connecting devices.

The ferrule 87, that is shown embedded in the rubber valve stem 88 in Fig. 9, is disposed below and inwardly of the axially outermost rim 89 of the rubber stem 88. The ferrule 87 is threaded internally for the reception of the externally threaded lower portion of the thimble 90.

The thimble rib 91, that extends radially of the thimble 90 between its ends, provides a tool grip for turning the thimble 90 down into the ferrule 87 and compressing the rubber stem rim 89 between the rib 91 and the upper end of the ferrule 87 to provide a permanent air seal therebetween.

The inturned lower edge 92 of the thimble 90, supports the spider 58 that is apertured centrally to provide a guide for the valve pin 93 and also acts as a support for the spring 34.

The pin 93 terminates upwardly in an enlarged upper end 94 that serves as a pin contact with an inflation or deflating pin that forms a part of the conventional tire inflating connector. The pin 93 carries the preferably conical rubber valve seat 95 supporting plate 96 spaced from its upper tip. The rubber valve seat 95 preferably contacts the axially lower edge 97 of the air transmitting aperture in the top of the thimble 90 to form releasable air sealing engagement therewith. The pin end 94 preferably forms a dust and water seal with the aperture in the top of the thimble 90.

It is to be understood that the particular parts of the constructions that are disclosed herein and the rubber and the metal valve stems may be interchanged, where suitable operative constructions result from such interchange, and that the parts and the constructions that are disclosed and described herein are presented for purposes of illustration and explanation and that various changes and modifications and alterations may be made therein without departing from the invention as defined in the amended claims.

What I claim is:

1. An air valve assembly, comprising in combination, a stem having an air bore therein and terminating upwardly in an open extremity continuous with said air bore, a dust cap disposed on said stem to substantially overlie the open extremity thereof and having an inwardly flaring air conducting bore of smaller diameter at its upper extremity than inwardly thereof opening into the air bore of said stem, a permanent air seal and valve seat interposed between said stem upper extremity and said cap and continuously backed in substantially a single plane by a part of said cap, a pin having its upper end guided toward the center of the cap by the inwardly flaring bore thereof and substantially closing said dust cap air bore upper extremity against the undesirable admission of dust and water, a valve plate mounted on said pin between the ends thereof and supported by said pin for free tilting action in its engagement with the seat about the upper guided end of the pin as a center of rotation, a knife edge part of said valve plate engaging said valve seat to provide an air seal therewith that permits the substantially immediate passage of air on any material separation thereof, an apertured plate mounted in and supported by said stem, and a spring means interposed between said valve plate and said stem plate for yieldingly maintaining said valve plate in air sealing engagement with said valve seat.

2. An air valve assembly, comprising in combination, a stem having an air bore therein and terminating upwardly in an open extremity continuous with said air bore, a dust cap secured to said stem and substantially overlying the open extremity thereof and having a downwardly flaring air conducting bore opening into the air bore of said stem and of smaller diameter at its upper extremity than inwardly thereof, a permanent air seal and valve seat interposed between said stem upper extremity and said cap and continuously backed in substantially a single plane by a part of said cap inwardly of said stem upper extremity, a pin having a portion guided by said downwardly flaring bore and substantially closing said dust cap air bore upper extremity against the undesirable admission of dust and water, a valve mounted on said pin and supported by said pin for free tilting action in its engagement with the seat about the upper guided end of the pin as a center of rotation, a knife edge part of said valve engaging said valve seat to provide an air seal therewith that permits the substantially immediate passage of air on any material separation thereof, and resilient means supported in said stem bore and yieldingly supporting said valve in releasable engagement with said valve seat.

ARTHUR KEEFE.